(12) United States Patent
Lee et al.

(10) Patent No.: US 9,296,642 B2
(45) Date of Patent: Mar. 29, 2016

(54) ENAMEL COMPOSITION, PREPARATION METHOD THEREOF, AND COOKING APPLIANCE INCLUDING THE SAME

(71) Applicant: LG ELECTRONICS INC., Seoul (KR)

(72) Inventors: Youngjun Lee, Seoul (KR); Namjin Kim, Seoul (KR); Yongsoo Lee, Seoul (KR); Youngseok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 331 days.

(21) Appl. No.: 13/889,956

(22) Filed: May 8, 2013

(65) Prior Publication Data

US 2013/0299484 A1    Nov. 14, 2013

(30) Foreign Application Priority Data

May 10, 2012  (KR) .................... 10-2012-0049536

(51) Int. Cl.
| | | |
|---|---|---|
| *A21B 1/00* | (2006.01) | |
| *C03C 8/08* | (2006.01) | |
| *C03C 3/062* | (2006.01) | |
| *C03C 8/02* | (2006.01) | |
| *F24C 15/00* | (2006.01) | |
| *F24C 15/08* | (2006.01) | |

(52) U.S. Cl.
CPC . *C03C 8/08* (2013.01); *C03C 3/062* (2013.01); *C03C 8/02* (2013.01); *F24C 15/005* (2013.01); *F24C 15/08* (2013.01); *C03C 2205/04* (2013.01); *C03C 2207/04* (2013.01); *Y10T 428/2982* (2015.01)

(58) Field of Classification Search
CPC ............. C03C 4/20; C03C 8/08; C03C 8/06; C03C 8/00; C03C 2205/04; F24C 15/005; Y10T 428/28; Y10T 428/252; H05B 6/6402
See application file for complete search history.

(56) References Cited

U.S. PATENT DOCUMENTS

| | | | | |
|---|---|---|---|---|
| 5,296,415 | A | * | 3/1994 | Podesta ........................ 501/25 |
| 2009/0311514 | A1 | | 12/2009 | Shon et al. |
| 2011/0049122 | A1 | * | 3/2011 | Baek et al. .................... 219/385 |
| 2011/0262758 | A1 | | 10/2011 | Benford et al. |

FOREIGN PATENT DOCUMENTS

| | | | |
|---|---|---|---|
| JP | 11139847 | * | 5/1999 |
| JP | 2005-008974 A | | 1/2005 |
| KR | 1020110023079 A | | 3/2011 |
| RU | 2 207 992 C2 | | 7/2003 |

OTHER PUBLICATIONS

Database WPI Thomson Scientific, London, GB; AN 1979-61268b XP002712466, & SU 631 478 AI (0 KT Byuro Kristall) Nov. 5, 1978.

* cited by examiner

*Primary Examiner* — Shawntina Fuqua
(74) *Attorney, Agent, or Firm* — Dentons US LLP

(57) ABSTRACT

Provided are an enamel composition, a preparation method thereof, and a cooking appliance including the same. The enamel composition includes a glass frit containing $P_2O_5$, $SiO_2$, $TiO_2$, $Na_2O$, and $Al_2O_3$. The glass frit contains about 10 wt % to about 25 wt % of $SiO_2$, about 5 wt % to about 20 wt % of $TiO_2$, about 5 wt % to about 15 wt % of $Na_2O$, and about 9 wt % to about 20 wt % of $Al_2O_3$, and the glass frit has a glass deformation temperature of about 500° C. or more, and a reflectivity of about 70% or more.

11 Claims, 2 Drawing Sheets

ENAMEL COMPOSITION, PREPARATION METHOD THEREOF, AND COOKING APPLIANCE INCLUDING THE SAME

CROSS-REFERENCE TO RELATED APPLICATIONS

The present application claims priority under 35 U.S.C. §119 to Korean Patent Application No. 10-2012-0049536 filed on May, 10, 2012, which is hereby incorporated by reference in its entirety.

BACKGROUND

The present disclosure relates to an enamel composition.

Enamels are prepared by applying hyaline glaze on a surface of a metal plate. General enamels may be used in cooking appliances such as microwaves, electronic ranges, and the like. Enamels may be classified as acid proof enamels for antioxide and heat-resisting enamels which are endured at a high temperature according to a kind or use of glaze. Also, enamels may be classified as aluminum enamels, zirconium enamels, titanium enamels, and soda glass enamels according to a material added into the enamels.

Generally, cooking appliances are home appliances for heating and cooking foods using a heat source. Slops generated during the cooking may be attached to an inner wall of a cavity of such a cooking appliance. Thus, after foods are cooked in the cooking appliance, it is necessary to clean the inside of the cavity. Also, the cooking of foods may involve a high temperature, and the inner wall of the cavity may be exposed to organic materials and alkali components. Thus, when enamels are used in cooking appliances, the enamels should have heat resistance, chemical resistance, wear resistance, and contamination resistance. Therefore, an enamel composition for improving the heat-resistance, the chemical resistance, the wear resistance, and the contamination resistance may be required.

Particularly, a pyrolysis method in which contaminants burn at a high temperature to make ashes or a method using strong alkali detergent may be used as technologies for easily cleaning enamels used in general ovens. As a result, since the enamels are exposed to the high temperature and strong alkali detergent, enamels having heat resistance and chemical resistance are required.

Also, to manufacture the above-described enamels, various kinds of glass frits may be used. That is, to manufacture the enamels, glass frits having components different from each other may be used. In this case, various kinds of glass frits may be prepared, and then a process of mixing the glass frits with each other may be performed. Thus, high energy consumption and high faulty rate may occur.

SUMMARY

Embodiments provide a colored enamel composition having improved heat resistance and high reflectivity and a preparation method thereof.

In one embodiment, an enamel composition includes: a glass frit containing $P_2O_5$, $SiO_2$, $TiO_2$, $Na_2O$, and $Al_2O_3$, wherein the glass frit contains about 10 wt % to about 25 wt % of $SiO_2$, about 5 wt % to about 20 wt % of $TiO_2$, about 5 wt % to about 15 wt % of $Na_2O$, and about 9 wt % to about 20 wt % of $Al_2O_3$, where the glass frit has a glass deformation temperature of about 500° C. or more, and a reflectivity of about 70% or more.

The glass frit may further contain one or more compounds selected from the group comprising $K_2O$, $Li_2O$, $V_2O_5$, ZnO, and BaO.

The glass frit may contain about 28 wt % to about 32 wt % of $P_2O_5$, about 13 wt % to about 16 wt % of $SiO_2$, about 16 wt % to about 20 wt % of $TiO_2$, about 9 wt % to about 12 wt % of $Na_2O$, and about 9 wt % to about 12 wt % of $Al_2O_3$.

The glass frit may have a white color.

The glass frit may contain about 6 wt % to about 8 wt % of $K_2O$, about 0.1 wt % to about 1 wt % of $Li_2O$, about 1 wt % to about 3 wt % of $V_2O_5$, about 0.5 wt % to about 1.5 wt % of ZnO, and about 5 wt % to about 7 wt % of BaO.

The glass frit may have a glass deformation temperature of about 500° C. to about 700° C.

The glass frit may have reflectivity of about 70% to about 99%.

The glass frit may further comprises CaO and/or MgO.

The glass frit may further comprises one or more compounds selected from the group comprising $B_2O_3$, $Bi_2O_3$, CeO and $ZrO_2$.

The glass frit may have a diameter of about 0.1 μm to about 50 μm.

In another embodiment, a method of preparing an enamel composition includes: preparing a glass frit material including $P_2O_5$, $SiO_2$, $TiO_2$, $Na_2O$, and $Al_2O_3$; melting the glass frit material; and quenching the melted glass frit material to form a glass frit, wherein the glass frit contains about 10 wt % to about 25 wt % of $SiO_2$, about 5 wt % to about 20 wt % of $TiO_2$, about 5 wt % to about 15 wt % of $Na_2O$, and about 9 wt % to about 20 wt % of $Al_2O_3$, where the glass frit has a glass deformation temperature of about 500° C. or more, and a reflectivity of about 70% or more.

The glass frit may have reflectivity of about 80% to about 99%.

In further another embodiment, a cooking appliance includes: a cavity defining a cooking chamber; a door selectively opening or closing the cooking chamber; at least one heating source providing heat to heat foods into the cooking chamber; and a coating layer formed of one of the above-mentioned enamel composition, which is coated on an inner surface of the cavity.

In further another embodiment, a cooking appliance includes: a cavity defining a cooking chamber; a door selectively opening or closing the cooking chamber; at least one heating source providing heat to heat foods into the cooking chamber; and a coating layer formed of one of the above-mentioned enamel composition, which is coated on an inner surface of the cavity and a back surface of the door facing the cooking chamber in a state where the cooking chamber is covered.

The details of one or more embodiments are set forth in the accompanying drawings and the description below. Other features will be apparent from the description and drawings, and from the claims.

DETAILED DESCRIPTION OF THE EMBODIMENTS

Figure 1:
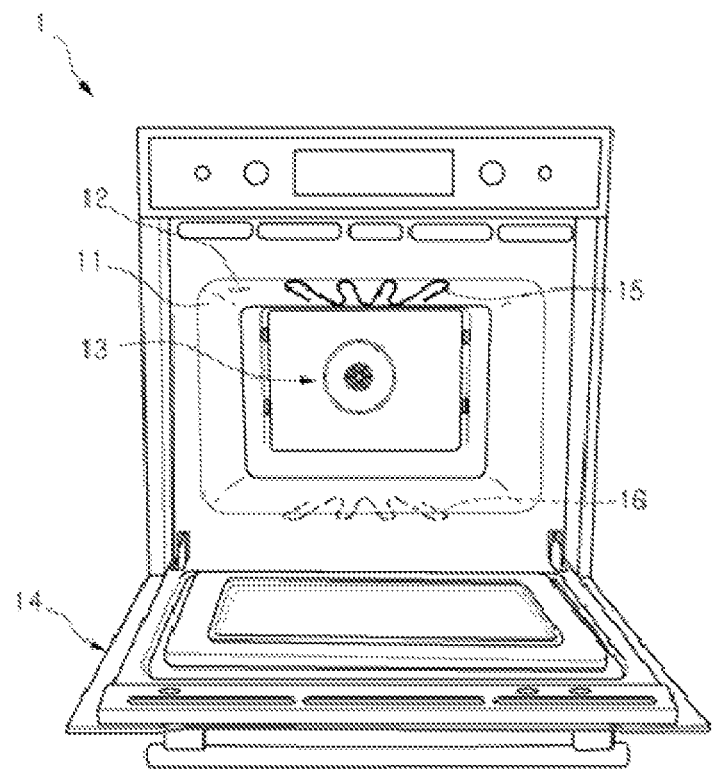
FIG. 1 is a front view of a cooking appliance according to an embodiment.

An enamel composition according to an embodiment includes a glass frit containing $P_2O_5$, $SiO_2$, $TiO_2$, $Na_2O$, and $Al_2O_3$.

Also, the glass frit may further contain one or more compounds selected from the group comprising $K_2O$, $Li_2O$, $V_2O_5$, ZnO, and BaO.

The glass frit may contain about 25 wt % to about 30 wt % of $P_2O_5$. Preferably, the glass frit may contain about 28 wt % to about 32 wt % of $P_2O_5$.

The glass frit may contain about 10 wt % to about 25 wt % of $SiO_2$. Preferably, the glass frit may contain about 13 wt % to about 16 wt % of $SiO_2$.

$TiO_2$ may be contained in an amount of about 5 wt % to about 20 wt % in the glass frit. Particularly, $TiO_2$ may be contained in an amount of about 16 wt % to about 20 wt % in the glass frit.

$Na_2O$ may be contained in an amount of about 5 wt % to about 15 wt % in the glass frit. Particularly, $Na_2O$ may be contained in an amount of about 9 wt % to about 12 wt % in the glass frit.

$Al_2O_3$ may be contained in an amount of about 9 wt % to about 20 wt % in the glass frit. Particularly, $Al_2O_3$ may be contained in an amount of about 9 wt % to about 12 wt % in the glass frit.

Particularly, the glass frit may contain about 10 wt % to about 25 wt % of $SiO_2$, about 5 wt % to about 20 wt % of $TiO_2$, about 5 wt % to about 15 wt % of $Na_2O$, and about 9 wt % to about 20 wt % of $Al_2O_3$.

More particularly, the glass frit contains about 28 wt % to about 32 wt % of $P_2O_5$, about 13 wt % to about 16 wt % of $SiO_2$, about 16 wt % to about 20 wt % of $TiO_2$, about 9 wt % to about 12 wt % of $Na_2O$, and about 9 wt % to about 12 wt % of $Al_2O_3$.

The glass frit may have high reflectivity by adequately adjusting the compositions of $SiO_2$, $TiO_2$, $Na_2O$, and $Al_2O_3$. Particularly, the glass frit may have reflectivity of about 70% or more. More particularly, the glass frit may have reflectivity of about 70% to about 99%. More particularly, the glass frit may have reflectivity of about 80% to about 99%.

Also, the glass frit may have a white color by adequately adjusting the compositions of $SiO_2$, $TiO_2$, $Na_2O$, and $Al_2O_3$ as described above.

Also, the glass frit may further contain the Group I-based oxide in addition to $Na_2O$. The Group I-based oxide is selected from $Na_2O$, $K_2O$, and $Li_2O$. Particularly, the Group I-based oxide may include $Na_2O$ and $K_2O$. More particularly, the Group I-based oxide may include $Na_2O$, $K_2O$, and $Li_2O$. That is, the glass frit may further contain all of $Na_2O$, $K_2O$, and $Li_2O$.

$K_2O$ may be contained in an amount of about 0.1 wt % to about 10 wt % in the glass frit. Particularly, $K_2O$ may be contained in an amount of about 6 wt % to about 8 wt % in the glass frit.

$Li_2O$ may be contained in an amount of about 0.1 wt % to about 5 wt % in the glass frit. Particularly, $Li_2O$ may be contained in the glass frit in an amount of about 0.1 wt % to about 1 wt %.

$P_2O_5$ and the Group I-based oxide ($Na_2O$, $K_2O$, and/or $Li_2O$) may form an alkali phosphate glass structure. Also, $P_2O_5$ and the Group I-based oxide may give an improved cleaning performance to the enamel composition according to an embodiment. That is, since the glass frit contains $P_2O_5$ and the Group I-based oxide, when a coating film formed of the enamel composition according to an embodiment is contaminated by foods, the coating film may be easily cleaned by water.

$SiO_2$, $Al_2O_3$, $TiO_2$, or BaO may improve heat resistance characteristics of the enamel composition according to an embodiment. Particularly, $SiO_2$, $Al_2O_3$, and $TiO_2$ may be combined with each other to improve heat resistance characteristics of the enamel composition according to an embodiment.

The glass frit may have a glass deformation temperature of about 500° C. or more. For example, the glass frit may have a glass deformation temperature of about 500° C. to about 700° C. Particularly, the glass frit may have a glass deformation temperature of about 570° C. to about 700° C. Thus, the coating film formed of the enamel composition according to an embodiment may have a glass deformation temperature of about 500° C. or more, and more particularly, a glass deformation temperature of about 500° C. to about 700° C. As a result, the enamel composition according to an embodiment may form the coating film which is not deformed at a high temperature.

Also, $Al_2O_3$, $V_2O_5$, and BaO may improve chemical durability of the glass frit. Particularly, $Al_2O_3$, $V_2O_5$, and BaO may complement weak chemical resistance of the alkali phosphate glass structure formed of $P_2O_5$ and the Group I-based oxide.

Also, BaO may interrupt the movement of alkali ions contained in the coating film. Thus, BaO may increase specific resistance of the coating film and improve adhesion of the coating film.

BaO may be contained in an amount of about 0.1 wt % to about 10 wt % in the glass frit. Particularly, BaO may be contained in an amount of about 5 wt % to about 7 wt % in the glass frit.

ZnO may adjust a surface tension of the coating film formed of the enamel composition according to an embodiment. Thus, ZnO may improve surface characteristics of the coating film.

ZnO may be contained in an amount of about 0.1 wt % to about 10 wt % in the glass frit. Particularly, ZnO may be contained in an amount of about 0.5 wt % to about 1.5 wt % in the glass frit.

Also, the enamel composition may further include the Group II-based oxide. The Group II-based oxide may be one of more selected from CaO and MgO. Particularly, the Group II-based oxide may contain CaO and MgO. That is, the glass frit may contain CaO and MgO.

The Group II-based oxide may be contained in an amount of about 0.1 wt % to about 3 wt % in the glass frit.

Also, the glass frit may further contain $B_2O_3$. $B_2O_3$ may be used to expand the glass area of the glass frit. In addition, $B_2O_3$ may adequately adjust a thermal expansion coefficient of the enamel composition according to an embodiment. $B_2O_3$ may be contained in the glass frit in an amount of about 0.1 wt % to about 5 wt %.

Also, the glass frit may further contain $Bi_2O_3$. $Bi_2O_3$ may improve chemical resistance and heat resistance of the enamel composition according to an embodiment. $Bi_2O_3$ may be contained in an amount of about 3 wt % to about 10 wt % in the glass frit.

Also, the glass frit may further contain CeO. CeO may improve the chemical resistance and the heat resistance of the enamel composition according to an embodiment. CeO may be contained in an amount of about 0.1 wt % to about 1 wt % in the glass frit.

Also, the glass frit may further contain $ZrO_2$. $ZrO_2$, $Al_2O_3$, and BaO may be combined with each other to improve heat resistance characteristics of the enamel composition according to an embodiment. $ZrO_2$ may be contained in an amount of about 0.1 wt % to about 5 wt % in the glass frit. Particularly, $ZrO_2$ may be contained in an amount of about 2 wt % to about 4 wt % in the glass frit.

Also, $TiO_2$ may adequately adjust the surface tension of the coating film. Also, $TiO_2$ may improve hiding effects of the enamel composition according to an embodiment. That is, hiding effects of the coating layer may be improved by $TiO_2$.

Also, the glass frit may contain about 28 wt % to about 32 wt % of $P_2O_5$, about 13 wt % to about 16 wt % of $SiO_2$, about 16 wt % to about 20 wt % of $TiO_2$, about 9 wt % to about 12 wt % of $Na_2O$, about 9 wt % to about 12 wt % of $Al_2O_3$, about 6 wt % to about 8 wt % of $K_2O$, about 0.1 wt % to about 1 wt % of $Li_2O$, about 1 wt % to about 3 wt % of $V_2O_5$, about 0.5 wt % to about 1.5 wt % of ZnO, and about 5 wt % to about 7 wt % of BaO.

The glass frit may have a diameter of about 0.1 μm to about 50 μm. Also, the glass frit may be dispersed into a solvent such as acetone or water. That is, the enamel composition according to an embodiment may be used by dispersing the glass frit into the solvent. Also, the enamel composition according to an embodiment may further include an organic binder. That is, the enamel composition according to an embodiment may be used as a form of paste.

The glass frit may have a diameter of about 0.1 μm to about 50 μm. Also, the glass frit may be dispersed into a solvent such as acetone or water. That is, the enamel composition according to an embodiment may be used by dispersing the glass frit into the solvent.

The enamel composition according to an embodiment may be manufactured by following processes.

First, a glass frit material for forming the glass frit is prepared. The glass frit material includes $P_2O_5$, $SiO_2$, $TiO_2$, $Na_2O$, and $Al_2O_3$. Also, the glass frit material may further include one or more of $K_2O$, $Li_2O$, $V_2O_5$, ZnO and BaO. Also, the glass frit material may further include one or more of $ZrO_2$, $B_2O_3$, $Bi_2O_3$ or CeO. Also, the glass frit material may further include the Group II-based oxide.

Thereafter, the glass frit material may be melted. For example, the glass frit material may be melted at a temperature of about 1,300° C. to about 1,600° C. Also, the glass frit material may be melted for about 1 hour to about 1.5 hours.

Thereafter, the melted glass frit material may be quenched by using a chiller or water. As a result, the glass frit may be formed. Here, a content of each of the components of the glass frit may be determined according to a content of each of the components included in the glass frit material. That is, a content of each of the components included in the glass frit material may be substantially equal to that of each of the components of the glass frit.

Thereafter, the glass frit may be dispersed by a solvent such as acetone. Thereafter, the solvent may be dried. Thereafter, the glass frit may be filtered by a mesh or the like. Particularly, the glass frit may be filtered so that the glass frit has a diameter of about 50 μm or less.

As described above, an enamel composition including the glass frit may be formed.

Thereafter, the enamel composition according to an embodiment may form the coating film through following processes.

The enamel composition according to an embodiment may be dispersed into a solvent such as water. That is, the glass frit may be dispersed into the solvent. Thereafter, the enamel composition according to an embodiment is coated on one surface of a target object to be coated through a spray method. The target object may be a metal plate or a tempered glass plate. Particularly, the target object may be a portion or the whole of a cooking appliance.

On the other hand, the enamel composition according to an embodiment may be coated on the target object in a state where the enamel composition is dried. The enamel composition according to an embodiment may be coated on the target object through electrostatic attraction.

Thereafter, the target object coated with the enamel composition according to an embodiment may be fired at a temperature of about 700° C. to about 900° C. The coated enamel composition may be fired for about 100 seconds to about 400 seconds.

As a result, the enamel composition according to an embodiment may form a coating film on the target object.

The enamel composition according to an embodiment may have reflectivity of about 70% or more by adequately adjusting the compositions of $SiO_2$, $TiO_2$, $Na_2O$, and $Al_2O_3$. Also, the enamel composition according to an embodiment may have a glass deformation temperature of about 500° C. or more by adequately adjusting the compositions of $SiO_2$, $TiO_2$, $Na_2O$, and $Al_2O_3$.

Thus, the enamel composition according to an embodiment may have a white color and high thermal resistance by adequately adjusting the compositions of $SiO_2$, $TiO_2$, $Na_2O$, and $Al_2O_3$. Thus, the enamel composition according to an embodiment may be efficiently applied to the cooking appliance.

Hereinafter, a cooking appliance according to an embodiment will be described in detail with reference to the accompanying drawings.

Figure 2:
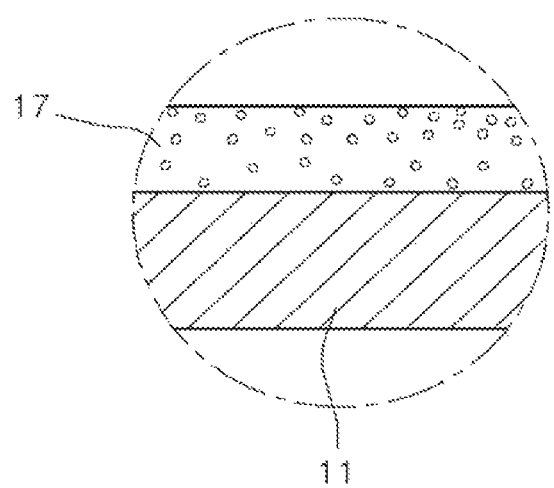
FIG. 2 is a partial enlarged cross-sectional view illustrating an inner surface of a cavity of FIG. 1.
Figure 3:
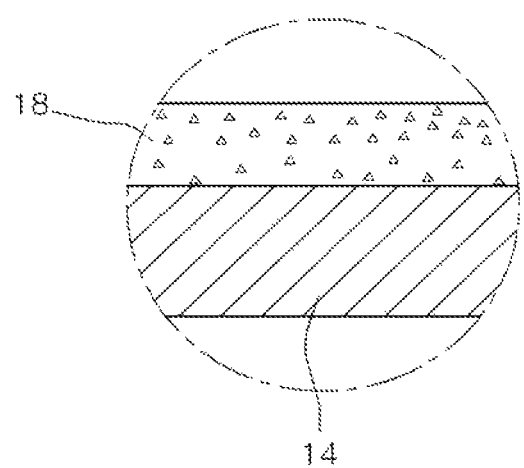
FIG. 3 is a partial enlarged cross-sectional view illustrating a back surface of a door of FIG. 1.

FIG. 1 is a front view of a cooking appliance according to an embodiment. FIG. 2 is a partial enlarged cross-sectional view illustrating an inner surface of a cavity of FIG. 1. FIG. 3 is a partial enlarged cross-sectional view illustrating a back surface of a door of FIG. 1.

Referring to FIG. 1, a cooking appliance 1 includes a cavity 11 defining a cooking chamber 12, a door 14 selectively opening or closing the cooking chamber 12, and at least one heating source 13, 15, or 16 providing heat for heating foods into the cooking chamber 12.

More particularly, the cavity 11 may have an approximately hexahedral shape with an opened front side. The heating sources 13, 15, and 16 include a convection assembly 13 for discharging heated air into the cavity 11, an upper heater 15 disposed on an upper portion of the cavity 11, and a lower heater disposed on a lower portion of the cavity 11. The upper heater 15 and the lower heater 16 may be disposed inside or outside the cavity 11. The heating source 13, 15, or 16 does not necessarily need to include the convection assembly 13, the upper heater 15, and the lower heater 16. That is, the heating source 13, 15, or 16 may include at least one of the convection assembly 13, the upper heater 15, and the lower heater 16.

Referring to FIG. 2, the coating layer 17 is disposed on an inner surface of the cavity 11. The coating layer 17 is manufactured by coating the above-described enamel composition on the inner surface of the cavity 11. Substantially, the coating layer 17 may improve heat resistance, chemical resistance, and contamination resistance on the inner surface of the cavity 11.

Particularly, the cavity 11 and the door 14 may be provided as metal plates, respectively. The coating layers 17 and 18 may be directly coated on the metal plates. That is, since the enamel composition according to an embodiment contain the adhesion enhancement component, the coating layers 17 and 18 may be directly coated on the metal plates without providing an additional buffer layer.

Referring to FIGS. 1 and 3, the coating layer 18 is disposed on the back surface of the door 14. Particularly, the coating layer 18 may be disposed on the back surface of the door 14 facing the cooking chamber 12 in a state where the cooking chamber 12 is covered. The coating layer 18 may improve the heat resistance, the chemical resistance, and the contamination resistance on the back surface of the door 14. That is, the back surface of the door 14 may have the same effect as the inner surface of the cavity 11.

Thus, the inner surface of the cavity 11 and the back surface of the door 14 may be improved in heat resistance and thus endured for a long time during the cooking and cleaning of the foods at a high temperature. Also, since the inner surface of the cavity 11 and the back surface of the door 14 are improved in contamination resistance by the coating layers 17 and 18, a phenomenon in which the inner surface of the cavity 11 and the back surface of the door 14 are contaminated by organic materials may be reduced, and also, the inner surface of the cavity 11 and the back surface of the door 14 may be easily cleaned. Also, since the inner surface of the cavity 11 and the back surface of the door 14 are improved in chemical resistance, the inner surface of the cavity 11 and the back surface of the door 14 are not corroded without being deformed by organic materials and alkali chemical components even though the cooking appliance is used for a long time.

Also, a particular feature, structure, or effects described in connection with the embodiment is included in at least one embodiment of the invention, and is not limited to only one embodiment. Further, when a particular feature, structure, or characteristic is described in connection with any embodiment, it is submitted that it is within the purview of one skilled in the art to effect such feature, structure, or characteristic in connection with other ones of the embodiments. Therefore, contents with respect to various variations and modifications will be construed as being included in the scope of the present disclosure.

The enamel composition according to the embodiment may have reflectivity of about 70% or more by adequately adjusting the compositions of $SiO_2$, $TiO_2$, $Na_2O$, and $Al_2O_3$. Also, the enamel composition according to the embodiment may have a glass deformation temperature of about 500° C. or more by adequately adjusting the compositions of $SiO_2$, $TiO_2$, $Na_2O$, and $Al_2O_3$.

Thus, the enamel composition according to the embodiment may have a white color and high durability by adequately adjusting the compositions of $SiO_2$, $TiO_2$, $Na_2O$, and $Al_2O_3$. Thus, the enamel composition according to the embodiment may be efficiently applied to the cooking appliance.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. Therefore, contents with respect to various variations and modifications will be construed as being included in the scope of the present disclosure.

Experimental Example

As shown in Table 1 below, a glass frit material is provided. Thereafter, the glass frit material is melted for 1 hour at a temperature of about 1,500° C. Thereafter, the melted glass frit material is quenched through a chiller to manufacture a raw frit. Then, the raw frit is dispersed into acetone and milled for 5 hours by using a ball mill. The raw frit is dried, and then filtered through a mesh (325 mesh sieve) so that the raw frit has a diameter of about 45 μm to form a glass frit.

Thereafter, an enamel composition including the glass frit is coated on an iron plate through a corona discharge gun.

Thereafter, the coated enamel composition is fired at a temperature of about 850° C. for about 300 seconds to form a coating film.

TABLE 1

| Component | Rate (wt %) |
| --- | --- |
| $P_2O_5$ | 29.67 |
| $Al_2O_3$ | 10.61 |
| $SiO_2$ | 14.21 |
| $TiO_2$ | 18.81 |
| $Na_2O$ | 10.66 |
| $K_2O$ | 6.78 |
| $Li_2O$ | 0.48 |
| $V_2O_5$ | 1.79 |
| ZnO | 1.11 |
| BaO | 5.87 |

Results

It is seen that the coating film formed as described above has a glass deformation temperature Td of about 584° C., i.e., very high heat resistance characteristics. Also, it is seen that the coating film has high cleaning performance, thermal shock stability, high chemical resistance and high adhesion property. The coating film has a white color, and has a reflectivity of about 84%.

Particularly, to measure a thermal expansion coefficient and a heat resistance characteristic of a glass, both surfaces of a sample is ground in parallel, and then, a glass deformation temperature and a transition temperature and a thermal expansion coefficient up to Ts (glass softening point) were measured by using a thermo mechanical analyzer (TMA).

Cleaning performance of the above-described enamel composition is measured. In a method of measuring the cleaning performance, about 1 g of chicken oil or monster mesh is smoothly covered on a surface of a test body (a sample coated with an enamel having a size of about 200 mm×200 mm) by using a brush, and then, the test body coated with the contaminant is put into a constant-temperature oven to solidify the contaminant at 240° C. for 1 hour. After the contaminant is solidified, the test body is naturally cooled to confirm a cured degree thereof. Then, the test body is immersed into a 25° C. water bath for about 10 minutes. Thereafter, the cured chicken oil is polished with a force of less than 2.5 kgf by using a wet cloth. The surface of the contaminated enamel is uniformly polished by using a rod having a flat bottom with a diameter of about 5 cm. Here, reciprocating numbers for polishing are measured and then defined as cleaning numbers. Here, an evaluation index is as follows. The cleaning performance of the coating layer formed by the enamel composition, which is measured through the above-described method, is Level 5. Table 2 below shows the criteria for the cleaning performance.

Also, acid and alkali resistance performance of the coating layer formed of the enamel composition is measured. The acid resistance is measured by observing a surface change of the coating layer after a few drops of 10% of a citric acid solution onto the sample of the fired enamel and then cleanly polish the solution after 15 minutes. The alkali resistance evaluation is performed by using 10% of anhydrous sodium carbonate solution as a reagent through the same method as the acid resistance evaluation.

As a result, the acid resistance performance of the coating layer formed of the enamel composition is Grade A, and the alkali resistance performance is Grade AA. A degree of the acid and alkali resistance performance is evaluated by an ASTM or ISO 2722 method. Here, Grade AA represents very good, Grade A represents good, Grade B represents normal, Grade C represents low, and Grade D represents very low.

TABLE 2

| Cleaning number (Number) | Level |
|---|---|
| 1~5 | 5 |
| 6~15 | 4 |
| 16~25 | 3 |
| 26~50 | 2 |
| 51~ | 1 |

As described above, it is seen that the coating layer has high cleaning performance, thermal shock stability, high chemical resistance, and high adhesion.

What is claimed is:

1. An enamel composition comprising:
   a glass frit containing $P_2O_5$, $SiO_2$, $TiO_2$, $Na_2O$, $K_2O$, $Li_2O$, $V_2O_5$, ZnO, BaO, and $Al_2O_3$,
   wherein the glass frit contains 28 wt % to 32 wt % of $P_2O_5$, 13 wt % to 16 wt % of $SiO_2$, 16 wt % to 20 wt % of $TiO_2$, 9 wt % to 12 wt % of $Na_2O$, 6 wt % to 8 wt % of $K_2O$, 0.1 wt % to 1 wt % of $Li_2O$, 1 wt % to 3 wt % of $V_2O_5$, 0.5 wt % to 1.5 wt % of ZnO, 5 wt % to 7 wt % of BaO, and 9 wt % to 12 wt % of $Al_2O_3$,
   wherein the glass frit has a glass deformation temperature of 500° C. to 700° C.

2. The enamel composition according to claim 1, wherein the glass frit has a white color.

3. The enamel composition according to claim 1, wherein the reflectivity is 70% to 99%.

4. A method of preparing an enamel composition, the method comprising:
   preparing a glass frit material comprising $P_2O_5$, $SiO_2$, $TiO_2$, $Na_2O$, $K_2O$, $Li_2O$, $V_2O_5$, ZnO, BaO, and $Al_2O_3$;
   melting the glass frit material; and
   quenching the melted glass frit material to form a glass frit,
   wherein the glass frit contains 28 wt % to 32 wt % of $P_2O_5$, 13 wt % to 16 wt % of $SiO_2$, 16 wt % to 20 wt % of $TiO_2$, 9 wt % to 12 wt % of $Na_2O$, 6 wt % to 8 wt % of $K_2O$, 0.1 wt % to 1 wt % of $Li_2O$, 1 wt % to 3 wt % of $V_2O_5$, 0.5 wt % to 1.5 wt % of ZnO, 5 wt % to 7 wt % of BaO, and 9 wt % to 12 wt % of $Al_2O_3$,
   wherein the glass frit has a glass deformation temperature of about 500° C. to 700° C., and a reflectivity of about 70% or more.

5. The method according to claim 4, wherein the glass frit has a white color.

6. The method according to claim 4, wherein the reflectivity is 80% to 99%.

7. A cooking appliance comprising:
   a cavity defining a cooking chamber;
   a door selectively opening or closing the cooking chamber;
   at least one heating source providing heat to heat foods into the cooking chamber; and
   a coating layer formed of the enamel composition according to claim 1, which is coated on an inner surface of the cavity.

8. A cooking appliance comprising:
   a cavity defining a cooking chamber;
   a door selectively opening or closing the cooking chamber;
   at least one heating source providing heat to heat foods into the cooking chamber; and
   a coating layer formed of the enamel composition according to claim 1, which is coated on an inner surface of the cavity and a back surface of the door facing the cooking chamber in a state where the cooking chamber is covered.

9. The enamel composition according to claim 1, wherein the glass frit further comprises CaO and/or MgO.

10. The enamel composition according to claim 1, wherein the glass frit further comprises one or more compounds selected from the group comprising $B_2O_3$, $Bi_2O_3$, CeO and $ZrO_2$.

11. The enamel composition according to claim 1, wherein the glass frit has a diameter of 0.1 μm to 50 μm.

* * * * *